May 1, 1962 J. B. SAUNDERS 3,031,914
PARALLEL TESTING INTERFEROMETER
Original Filed Jan. 30, 1959 5 Sheets—Sheet 1

Fig. 2-A

INVENTOR
James B. Saunders
BY David Robbins
John C. Stahl
ATTORNEYS

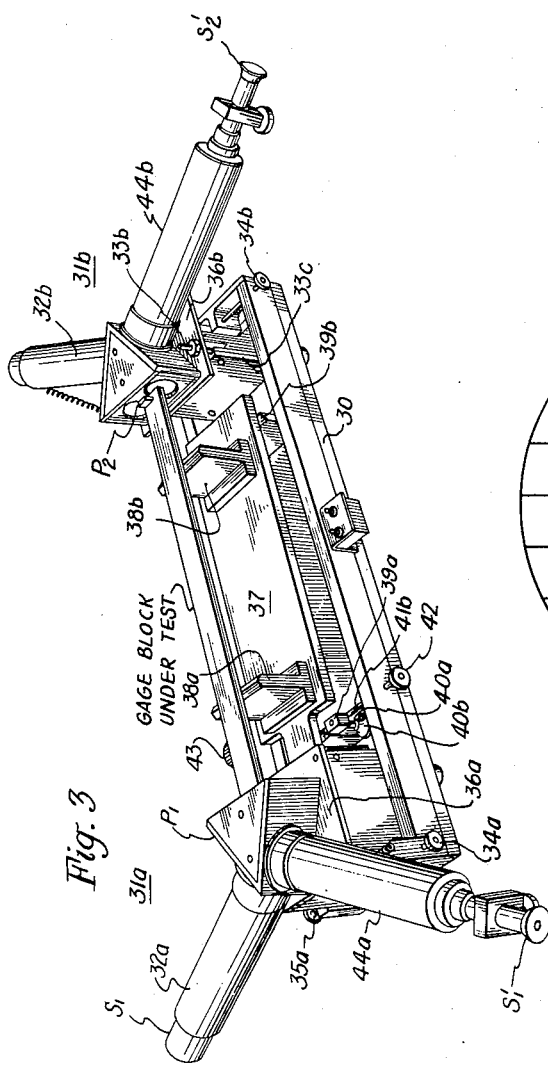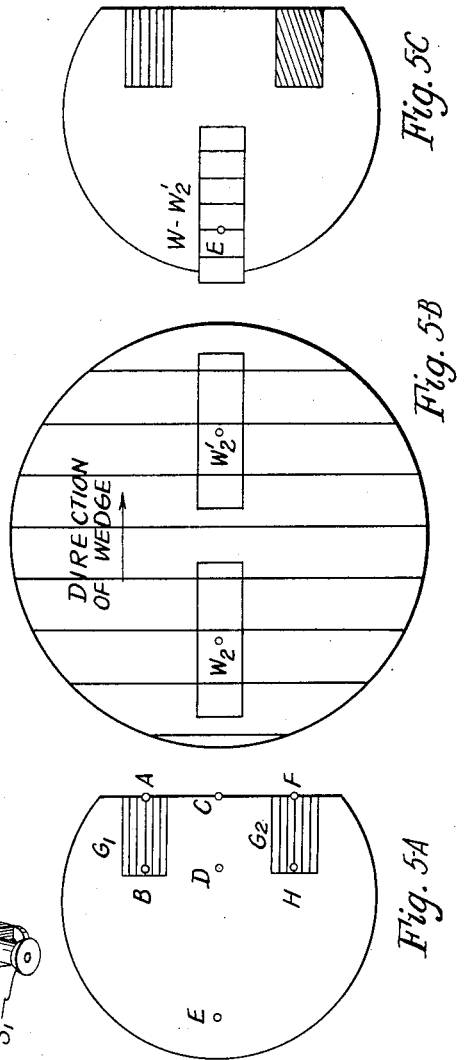

May 1, 1962 J. B. SAUNDERS 3,031,914
PARALLEL TESTING INTERFEROMETER
Original Filed Jan. 30, 1959 5 Sheets-Sheet 3
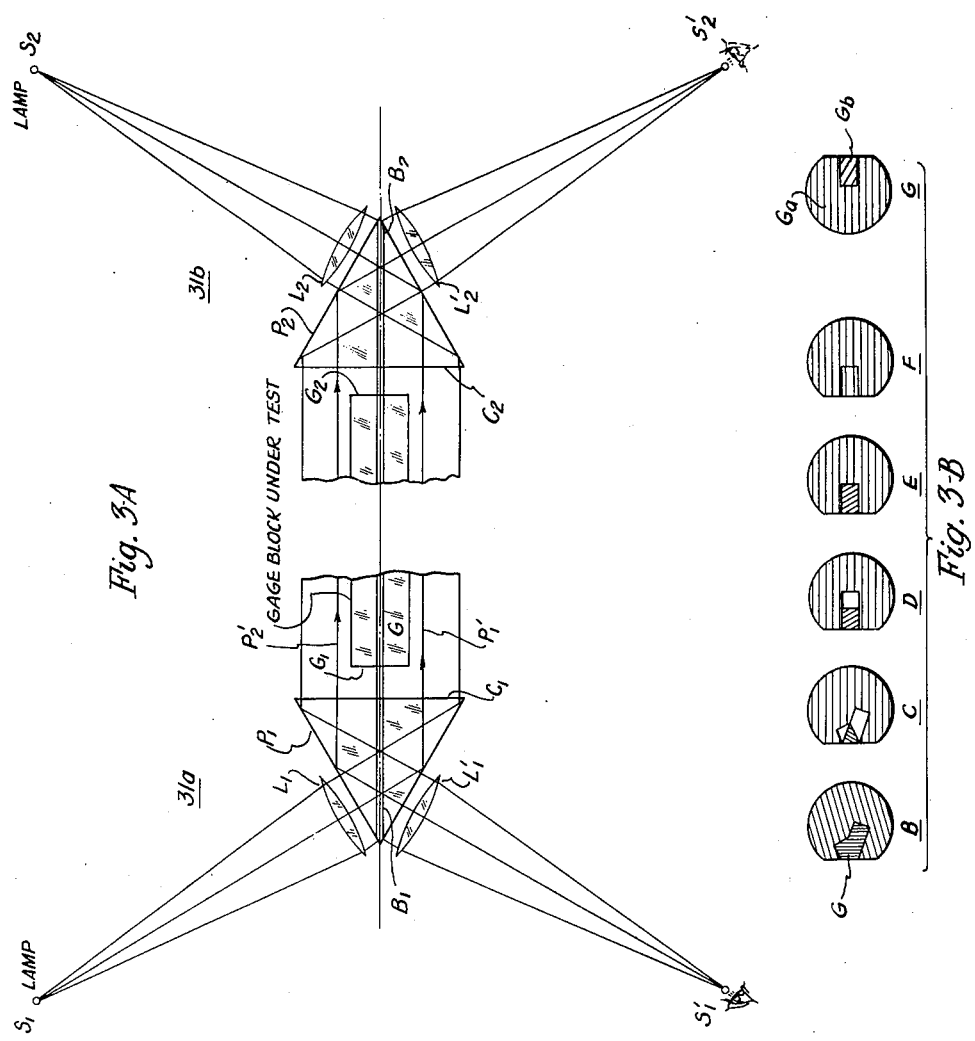
INVENTOR
James B. Saunders
BY
ATTORNEYS May 1, 1962  J. B. SAUNDERS  3,031,914
PARALLEL TESTING INTERFEROMETER
Original Filed Jan. 30, 1959  5 Sheets-Sheet 4
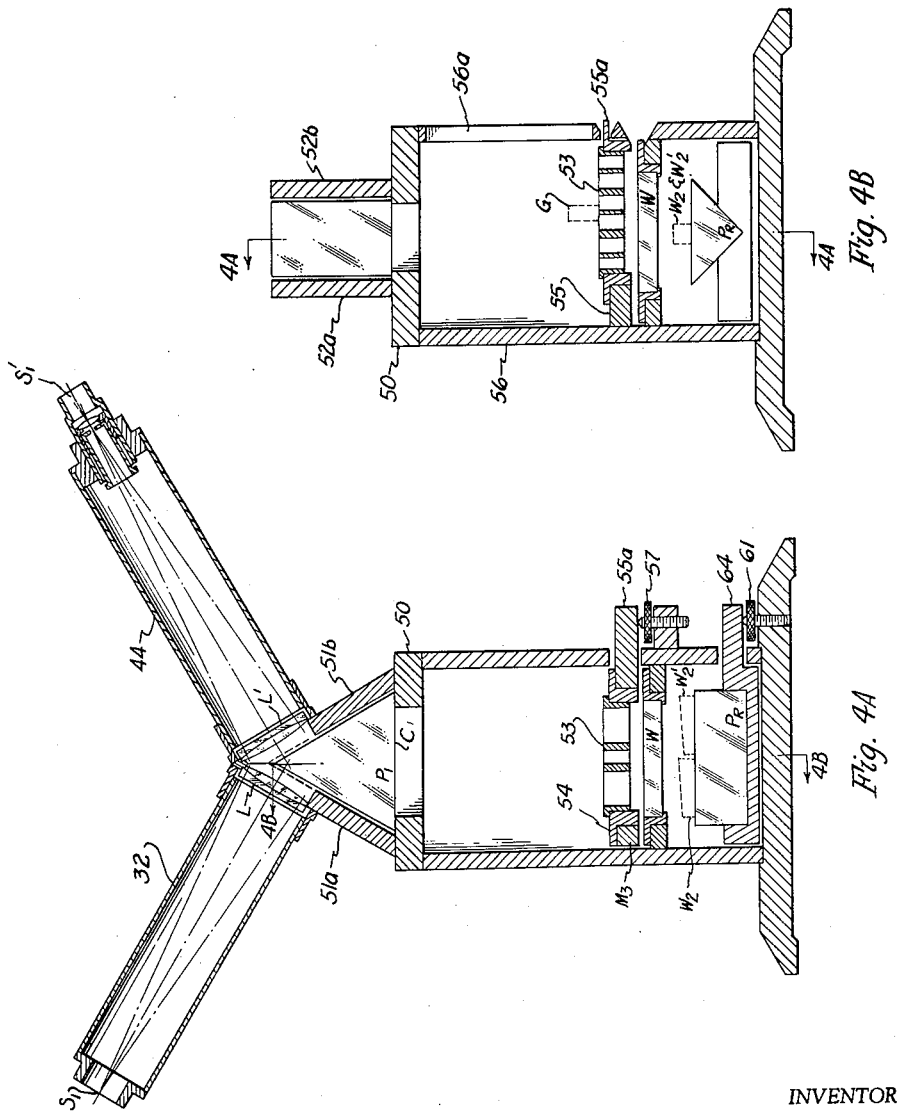
INVENTOR
James B. Saunders
BY David Gobbins
John C. Stahl
ATTORNEYS

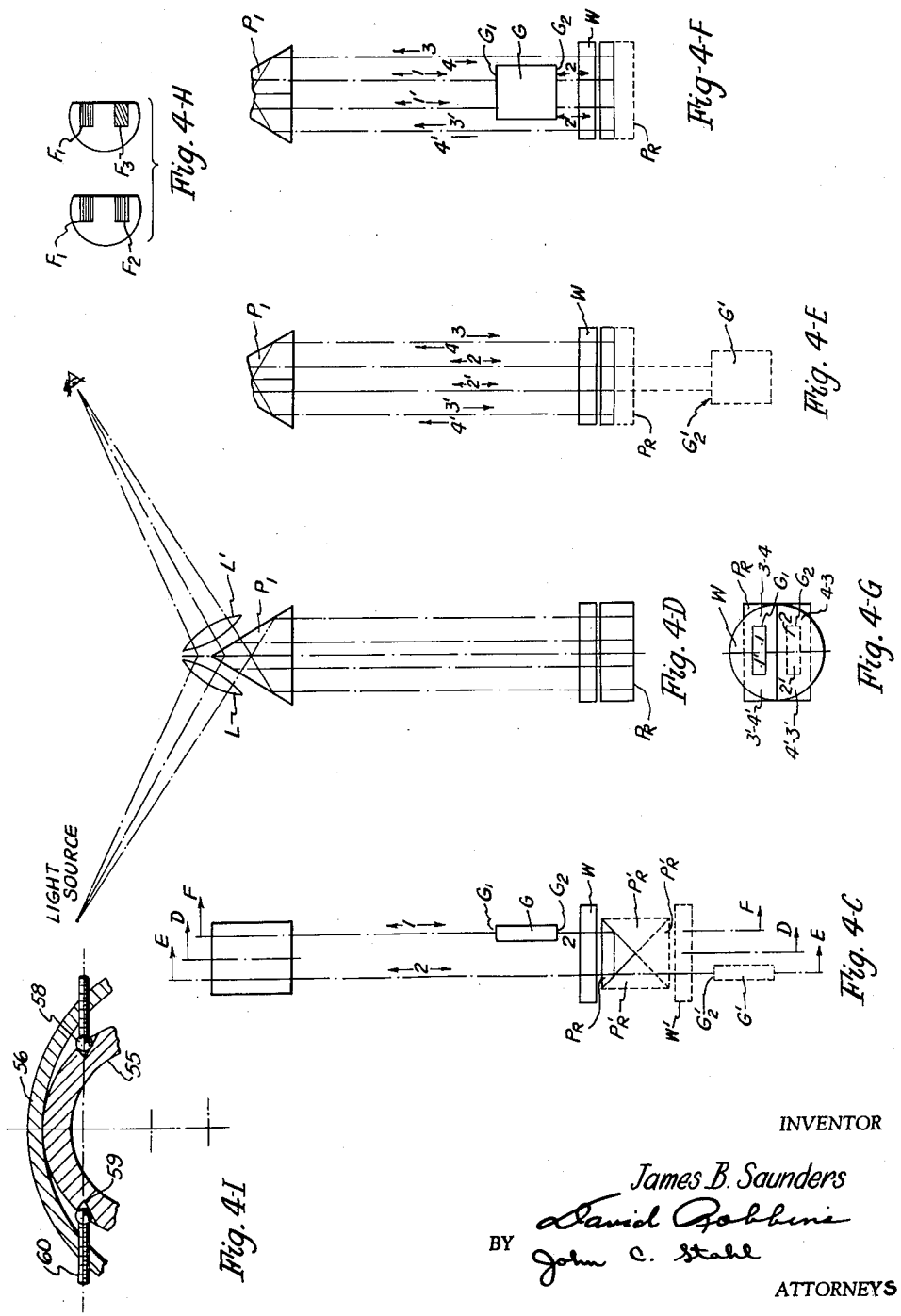

United States Patent Office 3,031,914
Patented May 1, 1962

3,031,914
PARALLEL TESTING INTERFEROMETER
James B. Saunders, Alexandria, Va., assignor to the United States of America as represented by the Secretary of Commerce
Original application Jan. 30, 1959, Ser. No. 790,312. Divided and this application May 3, 1960, Ser. No. 26,665
2 Claims. (Cl. 88—14)

Conventional procedures for measuring parallelism of gage blocks involve wringing two blocks, a standard and an unknown, side by side onto an optical flat and measuring the angle between the unwrung surface of each block and a common reference plane by light interference procedures. The wringing operation often injures the optical surfaces and repeated wringings necessitate frequent refinishing of the optical flat that is used as a base.

The present invention is a division of application Serial No. 790,312, Parallel Testing Interferometer, filed January 30, 1959, in the name of James B. Saunders.

The present invention contemplates an apparatus for measuring parallelism by completely optical means, thereby dispensing with the need for mechanically contacting the surfaces to be measured.

The principles of the invention may readily be incorporated into representative embodiments for parallel surface testing of both long and short gage blocks and similar bodies. Either embodiment uses low order interference and neither requires the use of a standard. Moreover, the instrument of the present invention may readily be adjusted by a few simple and stable controls and the design is such as to enable the angle between the gage block surfaces to be read directly from a calibrated scale.

It is accordingly an immediate object of the present invention to provide an improved interferometer enabling the rapid determination of parallelism in connection with gage blocks and the like without requiring mechanical contact with the surface being measured.

It is a further object of the present invention to provide an improved parallel testing interferometer which can provide optically precise measurements of surface parallelism by a relatively unskilled operator.

A still further object of the present invention is to provide an improved parallel testing interferometer which is calibrated to give a direct reading of the amount of inclination between the gage block surfaces.

Another object of this invention is to provide a novel parallel testing interferometer the principles of which can readily be embodied in instruments for measuring both long and short gage blocks respectively.

Still another object of this invention is to provide an improved parallel testing interferometer which is simple, compact and relatively inexpensive and one which enables rapid determination of surface parallelism.

Other uses and advantages of the invention will become apparent upon reference to the specification and drawings, in which FIG. 1A is a symbolic diagram illustrating the principles of the invention;

FIG. 2A is a further detailed side view of FIG. 2;

FIG. 3 is an isometric view of one embodiment of this invention particularly adaptable for testing long gage blocks;

FIG. 3A is an optical diagram illustrating the light-ray paths in connection with the instrument of FIG. 3;

FIG. 3B shows typical objective images produced by the mechanism of FIG. 3;

FIGS. 4A and 4B are sectional views of another embodiment of the present invention particularly suitable for testing short gage blocks;

FIGS. 4C–4G are optical diagrams of the short gage testing interferometer of FIGS. 4A and 4B;

FIG. 4H illustrates typical fringe patterns obtained with the modification of FIGS. 4A–4B;

FIG. 4I is a fragmentary sectional view of a device for rotating the plate shown in FIG. 4A about a horizontal axis, and FIGS. 5A, 5B, and 5C illustrate the manner of interpreting fringe line patterns involved in the calibration of the instruments of this invention.

As in other interferometers, the basic principle utilized in the present instrument is that if two beams of light from the same source travel along different paths and then come together again, they will form a pattern of interference fringes, the number of fringes depending on the difference in optical path length. Usually, the two beams are reflected from different surfaces, so that the fringes give information about the relative position of the two surfaces. However, the application of the interference principle to the present invention is somewhat more complex.

Looking through the eyepiece, two separate interference patterns may be observed, one for each of the gage-block surfaces being compared. Each pattern is formed by the interference of light rays reflected from different parts of the same surface, a result obtained by using a double-image prism. If the two block surfaces are parallel, the fringe patterns are also parallel; otherwise the two sets of fringes are inclined by an amount that depends on the angle between the surfaces. However, in accordance with one form of this invention, by placing a glass wedge in the path of the rays and rotating it to the correct position, the fringe patterns may be made parallel. The angle between the two surfaces can then be read directly from a suitably calibrated scale attached to the wedge.

In previous applications of interference to the measurement of gage-block parallelism, the procedure has been to wring the block onto an optically flat surface and to measure by interferometric means the angle between the upper surface of the block and the exposed portion of the optical flat. The wringing involves contact with the hand, which raises the block's temperature and may entail a long wait for temperature equilibrium to be established; it also causes undesirable wear of the gage-block surfaces.

The present instrument avoids both of these difficulties by measuring the angle between the opposite faces of the block by a direct comparison of the two faces. Although its optical arrangement is more complex, preliminary tests show not only that it can be operated more easily, but that the operating procedure can be reduced to a simple routine.

Figure 1B:
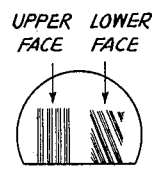
FIG. 1B shows typical fringe patterns produced by the instruments of this invention.
Figure 1A:
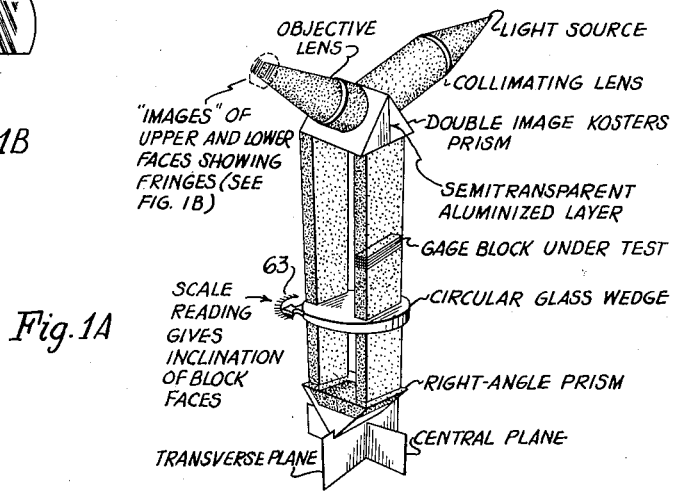

The principal optical components employed in the invention are diagrammatically shown in FIG. 1A. A double-image Kosters prism is made by taking two 30–60–90° prisms, depositing a semitransparent layer of aluminum on a face of one of them, and cementing the two together with the aluminized face on the inside. The resulting unit is a 60–60–60° prism which is "split" down the middle by a semitransparent layer. The detailed construction of such a prism is described in an article by J. Saunders in the NBS Journal of Research (January 1957). Such double-image prism is shown at the top of FIG. 1A. The right-angle prism shown at the bottom of FIG. 1A is used for its well-known reflective properties. Specifically a ray of light entering through the base (face opposite right angle) along any line perpendicular to the 90° edge will emerge, after two internal reflections, along a path exactly parallel (and opposite) to its original direction.

In describing the arrangement of the various components, it is useful to refer to the "central plane," which contains the aluminized layer; and to the "transverse plane," which is perpendicular to the central plane and passes through the center of the double-image prism. These planes are identified at the bottom of FIG. 1A.

The double-image prism is mounted with its base (face bisected by the aluminum film) downward and horizontal. The other right-angle prism is provided about a foot directly below its base upward and its 90° edge in the transverse plane as shown in FIG. 1A. The gage block to be measured is supported on a perforated plate provided between the upper double-image prism and the lower reflecting prism. It is placed to one side of the transverse plane so that its upper and lower surfaces (the angle between which is to be measured) are approximately horizontal and are bisected by the central plane.

Light from a point source is collimated into a parallel beam, the collimater axis being normal to one of the upper surfaces of the double-image prism. A viewing tube, containing an objective lens and a micrometer eyepiece, has its axis normal to the other upper surface of the double-image prism.

Basic Operation

Figure 2:
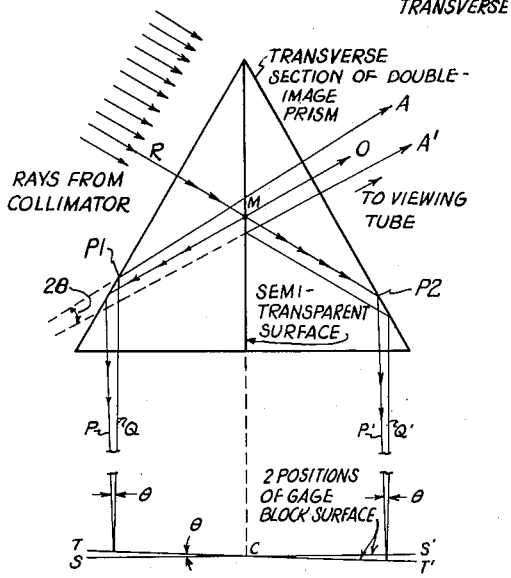
FIG. 2 is a diagram further detailing some of the optical principles involved.
Figure 2B:
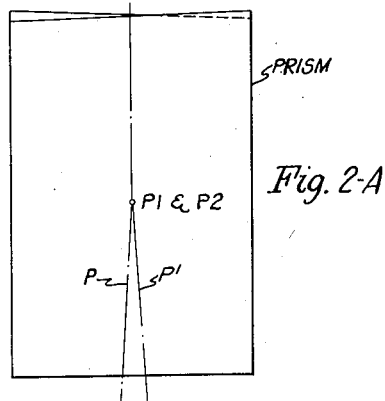
FIG. 2B is a fringe pattern illustrating interference effects consequent to FIGS. 2 and 2A.
Figure 2B:
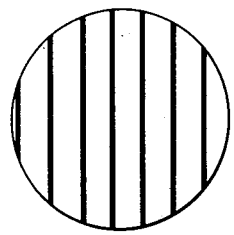

FIG. 2 is a more detailed diagrammatic illustration of the light-ray paths involved in the mechanism of FIG. 1A. The double-image prism used in the instruments of the present invention is adjusted during construction so that a ray of light, shown in the plane of FIG. 2, after division into two component rays P and P' at point M will, on reflection at points P1 and P2, lie in planes that are parallel to the semireflecting plane of the prism but deviate equally toward or from opposite sides of the plane of FIG. 2. The projection of the light rays on the dividing plane is shown in FIG. 2A, which is perpendicular to the plane of FIG. 2. This deviation is effected by rotating one component of the wedges from which the prism is made relative to the other about an axis normal to the dividing plane of the prism. If this deviation is held constant, the width of the interference fringes in the direction normal to the plane of FIG. 2 is fixed. This component of fringe width is, therefore, frozen into the system when the cement between the component prisms becomes hard by cooling after adjustments are complete. Furthermore, the tilting of any plane surface outside the prisms that affects the two component beams between division and recombination, will produce equal effects in this direction and, consequently, will not affect the fringe width. However, the rotation of plane surfaces about an axis normal to the plane of FIG. 1A will produce equal effects on the two component beams but in opposite directions, thus producing a proportionate effect on the fringe width in the direction parallel to this plane. As a result the lines of the fringe patterns produced by the instruments of this invention are relatively straight, clear and easy to observe while manipulating the instruments.

Because of the above-described properties of this prism, adjustments of the instrument in which it is used affect the fringe width in one direction only. Consequently, when measuring the parallelism of gage blocks the test can be applied to parallelism in only one direction at a time. To test for parallelism in other directions the block must be rotated.

Referring to FIG. 1A and FIG. 2, after division one component P' of the light beam continues ahead to the opposite face of the double-image prism and is then internally reflected straight downward; the other component P is bent back to the face through which it entered and is there reflected downward. The two emerging rays (which derive from a single original ray) are symmetrical with respect to the central plane (FIG. 1A).

Some of the rays on one side of the transverse plane strike the top surface of the gage block and are reflected back to the double-image prism. If the surface is perpendicular to the rays, both component rays of a symmetrical pair will be reflected back along their paths to the semitransparent surface. Here each ray is again split by such dividing plane within the double-image prism and half on one combines with half of the other to emerge along the same line towards the viewing tube.

The rays on the other side of the transverse plane in FIG. 1A pass through the right-angle prism and emerge verically upward. Some of these strike the lower surface of the gage block. If the lower surface of the gage block is perpendicular to the rays, a given symmetrical pair will be reflected back along their paths and, by the process described, combine to form a single ray moving toward the viewing tube.

Rays that do not strike the gage block are internally reflected in the right-angle prism, each ray of a pair moving up along the path by which the symmetrical ray had descended. As before, the two rays are recombined at the aluminized surface in the double-image prism and proceed to the viewing tube where they form the background of the field of view.

In FIG. 2, the light-ray, R, enters the double-image prism and is split into two components at point M of the semitransparent surface; after internal reflection, the two rays emerge along symmetrical paths P and P'. The test surface such as the surface of a gage block is designated as SS' in FIG. 2. If reflecting surface SS' is perpendicular to these rays, they return along the same paths to M where half of each ray combines with half of the other to form ray MO. Since both rays traverse equal optical paths, no interference fringes are formed. However, if SS' is rotated to the position TT', as in the case of a nonparallel surface, the rays return along Q and Q' and emerge in the directions A and A'. The lengths of the two paths now differ. If they differ by an even number of half-wavelengths of light, the rays reinforce each other when brought together by the lenses of the viewing tube; if by an odd number of half-wavelengths, the rays cancel, producing darkness. The amount of the difference depends on the distance of the symmetrical rays from the line through the center C of the reflecting surface and perpendicular to the plane of the diagram. Hence, the fringes of light and darkness run perpendicularly to the plane of the diagram. If the surface had been rotated, instead, about the axis SCS', no fringes would be produced, since the changes in path length would affect both members of a symmetrical pair of rays equally. Thus the instrument measures one component of the inclination at a time; to measure the other component the gage block represented by the surface SS' or TT' is rotated through 90°.

Returning to the illustration of FIG. 1A, the light from the collimator is split into the two beams corresponding to P and P' of FIG. 2 by the semitransparent layer, and parts of both beams strike the upper face of the block. If the block is adjusted so that the upper face as represented by SS' in FIG. 2 is perpendicular to the beams, the latter are reflected back along their paths and recombine at the semitransparent surface. If the glass wedge of FIG. 2 is ignored for the moment, the two beams travel the same distance and so do not form interference fringes. However, in accordance with one feature of this invention the double-image prism is modified as will be described by rotating the two halves of the prism relative to each other so that a permanent set of fringes is introduced. When the upper face of the gage block is now set perpendicular to the semitransparent surface, these fringes will also be perpendicular to that surface. At the same time, parts of both beams reach the lower face of the block by way of the right-angle prism. If the lower face is parallel to the upper face, a set of fringes parallel to those of the upper face is seen. If the faces are inclined, the fringes from the lower face will be rotated as shown in FIG. 1B. The glass wedge introduces a variable difference in the paths of the two beams, and if it is turned the correct amount, will compensate for the difference in path due to the inclination of the block faces. When such compensation is made, the two sets of fringes will be parallel. It is therefore possible to calibrate the scale associated with the wedge so that the inclination is read off directly. For simplicity, rays that do not strike either face of the block (and from the background of the field of view) are not shown in FIG. 1A.

*Long Block Interferometer*

FIG. 3 is an isometric view of one implementation of the present invention particularly adaptable for the measurement of parallel surfaces in connection with the faces of a long gage block. FIG. 3A is a diagrammatic view of the optical arrangement involved in the mechanism of FIG. 3.

Referring to FIG. 3, the interferometer for measuring long block gages includes a base or frame 30 on which an identically constructed optical assembly 31a, 31b is mounted at each end. Considering the optical assembly 31a, for example, there is provided a light source $S_1$ and a collimating tube 32a which carries a suitable optical lens system to be described in connection with FIG. 3A. A double-image prism $P_1$ of a type described in connection with FIG. 2 is carried within a suitable protective cover or housing as shown in FIG. 3. As can be seen from the identical prism $P_2$ on the right-hand end of the frame as viewed in FIG. 3, the housing is suitably supported on adjustable feet such as 33b for purposes of alignment and adjustment. Further adjusting screws such as 34a, 35a, having identical counter parts 34b etc. on the right-hand optical section 31b as viewed in FIG. 3 are provided for precisely aligning the instrument. The two prisms $P_1$ and $P_2$ in FIG. 3 are initially separated by a distance exceeding the length of the longest gage block to be tested.

The base 30 of the instrument is designed for rigidity so as to avoid flexure. Each of the prisms $P_1$ and $P_2$ are mounted on rigid tables such as 36a and 36b which are supported on the referred-to adjustable feet such as 33b. Three of such adjustable feet are provided for each optical assembly so as to permit not only raising and lowering of each of the prisms $P_1$ and $P_2$ but to allow rotation or tilting of the prism about any chosen horizontal axis. The prism housings are preferably fastened to the tables 36a and 36b by means of screw fastenings in over-sized holes to permit lateral adjustments of the prisms relative to each other. The adjusting screws such as 34a, 35a, are provided to permit small rotations of the prisms about a vertical axis by applying lateral torques to the table legs.

A support plate 37 is also provided on frame 30 for supporting the gage block under test. The supporting plate carries on its upper surface a pair of spaced knife-edge bearings 38a, 38b on which the gage block under test rests as shown in FIG. 3. The support plate 37 is in turn adjustably mounted on knife-edge bearings 39a, 39b. The knife-edge bearing 39b at the right-hand side of the support plate 37 as viewed in FIG. 3 is fixed to frame 30 but the bearing 39a on the left-hand side is mounted on adjustable means whereby it can be positioned both laterally and vertically with respect to frame 30 by means of adjusting screws 42 and 43 respectively. The specific details of the adjusting mechanisms employed are considered apparent from a mechanical standpoint and a further detailed description is not considered necessary for the purposes of explaining the invention. Each of the optical assemblies 31a and 31b shown in FIG. 3 also includes a telescopic eyepiece or objective such as 44a and 44b.

The over-all mechanical construction of the long block interferometer having been described the functioning and operative coaction among the elements will become apparent by reference to the optical diagram of FIG. 3A.

The optical elements such as the light source $S_1$, collimator 32a, prism $P_1$, $P_2$ etc. identified in FIG. 3 are designated by like references in FIG. 3A. Since each of the optical assemblies 31a and 31b are identical, a description of the elements comprising the assembly 31a will suffice. Referring to FIG. 3A, light from source $S_1$ is collimated by the collimating tube 32a shown in FIG. 3 and is focused by a lens such as $L_1$ contained within the tube, and divided into two equal components by the beam dividing plane $B_1$ of the double-image prism $P_1$ as described in connection with FIG. 2.

The light ray component from the source $S_1$ therefore suffers total internal reflection in the prism as described in connection with FIGS. 1 and 2 and emerges in a plane parallel to the dividing plane $B_1$ but at a small angle to the base surface $C_1$ of the prism. The latter condition is obtained by the referred-to rotation of the wedge components of the prism during manufacture. Accordingly, any light reflected from the surface $C_1$ is effectively eliminated. The dougle-image prism $P_2$ is similarly constructed.

The two prisms $P_1$ and $P_2$ are separated by a distance exceeding the length of the longest gage block to be tested. If desired such distance may be made adjustable by means of the adjusting means described in connection with FIG. 3, the dividing planes $B_1$ and $B_2$ in each double-image prism can readily be adjusted so as to be coplanar and the two base faces $C_1$ and $C_2$ of each prism can also be adjusted parallel to each other. In addition, a line joining the centers of the prisms $P_1$ and $P_2$ is adjusted to form a small angle with the normal to the prism base faces $C_1$ and $C_2$.

The light ray emerging from the prism $P_1$ has two separated components, as was described in connection with FIGS. 1 and 2, one on each side of the dividing plane $B_1$. The two emerging components from the prism $P_1$ are identified in FIG. 3A as $P_1'$ and $P_2'$, respectively. These components enter the opposite prism $P_2$ and again suffer total internal reflection in the described manner and a pair of component rays recombine in the dividing plane $B_2$ of the double-image prism $P_2$. One-half of the beam then proceeds to the source $S_2$ corresponding to the optical assembly 31b and the other half proceeds to the observation point $S_2'$ corresponding to the objective 44b of the right-hand optical assembly 31b described in connection with FIG. 3. At observation point $S_2'$ a set of interference fringes will be observed that cover the entire aperture of the objective. By analogy a similar condition prevails at optical assembly 31a resulting from light transmitted from the right-hand source $S_2$ and a set of interference fringes will be observed at objective $S_1'$. Thus two separate sets of interference fringe patterns are established corresponding to each opposite surface of the gage block under test.

A gage block to be tested G, inserted in the position shown in FIG. 3A with one end face $G_1$ adjusted normal to the light beams will reflect equal and corresponding parts of the two component light beams $P_1'$ and $P_2'$ from $S_1$ back through $P_1$ to $S_1'$. Accordingly, a background set of fringes will be seen at objective $S_1'$, produced by light from source $S_2$ and another set on face $G_1$ that is produced by light from source $S_1$. Since $G_1$ is normal to the light beams, these two sets of fringes will be parallel to each other and to the plane of FIG. 3A. If the other end surface $G_2$ of the gage block under test is parallel to $G_1$ the fringes observed at $S_2'$ will likewise be parallel to each other and to the plane of FIG. 3A. If, however, gage block surface $G_2$ is not parallel to $G_1$, in the plane of FIG. 3A, surface $G_2$ will not be normal to the light beams and the two sets of fringes observed at $S_2'$ will not be parallel to each other. The angle between these two sets of fringes is a measure of the angle between gage block surfaces $G_1$ and $G_2$. The component of the angle between $G_1$ and $G_2$ that is perpendicular to the plane of FIG. 3A does not affect the fringes because it affects all pairs of component beams equally. If the component of the angle between the gage block surfaces that is normal to FIG. 3A is desired the block must be rotated 90° and the operation repeated.

Since each prism $P_1$ and $P_2$ is adjusted for complete compensation in the plane of FIG. 3A, white light can be used. By measuring the vertical width of the fringes (perpendicular to FIG. 3A) for a known monochromatic light, with a micrometer eyepiece at objective $S_2'$, a calibration of the micrometer scale in units (microns, millionths of an inch, etc.) of length for measuring the displacement of white light fringes from a chosen reference point on the gage block surface will be obtained.

The manner in which the mechanism of FIGS. 3 and 3A is employed for adjusting a gage block can be explained with the aid of the patterns illustrated in FIG. 3B. In general, when a gage block is placed on its supports 38a, 38b (FIG. 3) the light reflected from its end surface will not reach the observer because of excessive angular deviation from the eyepiece. The block will appear in silhouette, as indicated at B in FIG. 3B. When the gage block surface $G_1$ is adjusted approximately normal to the light, fine fringes will usually be visible in the area covered by both images of it, as shown in pattern C. The images of the two parts of gage surface $G_1$ are made to coincide by rotating gage block G about the center line of FIG. 3A, causing the image to change from that of C to D, and a further lateral motion, without rotation, will then change the image from that shown at D to E. A further small rotation of gage block surface $G_1$ brings it normal to the light and the fringes on $G_1$ will appear horizontal and parallel to the background fringes as shown at F. An observation is then made at observing positions $S_2'$ and the two sets of fringes Ga, Gb shown at G will be seen. The angle between these two sets of fringes corresponds to the angle between gage block surfaces $G_1$ and $G_2$.

Short Gage Block Testing Interferometer

The principles of the present invention may also be implemented as an interferometer for the measurement of the surfaces of a short block gage. A particular embodiment of such device is shown in detail in the sectional views of FIGS. 4A and 4B. FIGS. 4C–4H diagrammatically illustrate the optical principles involved in the embodiment of FIGS. 4A–4B. FIG. 1A, previously referred to in explaining the principles of this invention, corresponds to the short-block testing modification.

FIGS. 4A and 4B are vertical sections through the center of the short block measuring interferometer embodiment of the present invention that are mutually perpendicular to and through the centers of each other. The source, S, provides illumination with either monochromatic or polychromatic light. The position of the source is adjustable in the focal plane of the collimator lens, L, and the collimator tube 32 is adjustable in length. The double-image prism is designated as $P_1$ in the modification of FIGS. 4A–4B, and rests on a thick plate 50 to which is fastened the lens holding plates 51a and 51b. A housing 56 is provided having an access opening 56a for positioning the gage block G to be tested. The housing provides an enclosure for the optical elements to be described and for supporting the prism $P_1$ and associated elements. Plates 52a and 52b (FIG. 4B) are provided to cover the end faces of prism $P_1$ but are not fastened to plates 51a, 51b. Consequently, small stresses applied to collimator tube 44 while adjusting the eyepiece or manipulating a micrometer in it will not transmit strains to $P_1$.

The test gage block, G, rests on a perforated rotatable plate 53 so as to transmit the required parts of the light beams used for making measurements. The plate 53 rotates in an annular ring 54 which in turn is rotatable, from outside the instrument, in an annular support 55. The aperture in annular ring 55 is eccentric with respect to the center or longitudinal axis of housing 56 in a direction parallel to the dividing plane of prism $P_1$ by an amount equal to one-half the horizontal separation between the center of the gage block surface $G_1$ and its image G' as shown in FIGS. 4C and 4D. The gage block rests on the center of plane 53 as seen in FIG. 4B. Accurate placement of the block is facilitated by stops not shown.

The eccentric annulus 55 is provided with an arm 55a that projects through the wall of the instrument housing 56. Annulus 55 is supported at three points one of which is an adjustable screw 57 shown in FIG. 4A. The other two supports for ring 55 consist of steel balls 58 (FIG. 4I) that are held in conical holes 59 in annulus 55 by means of pivot screws 60. The ends of these pivot screws have conical depressions that permit a limited amount of rotation of ring 53 about an axis normal to the dividing plane of double-image prism $P_1$. The screw 57 permits fine adjustment of support ring 54 and consequently the gage block which it supports, about a horizontal axis parallel to the dividing plane prism of $P_1$. A similar arrangement of balls, screws, and adjustable screw 61 permits rotation of the lower reflecting prism $P_R$ about two axes parallel to those used for adjusting annulus 55.

An optical wedge W is provided above the prism $P_R$ as shown in FIGS. 4A and 4B. If the refracting edge of the optical wedge W is made perpendicular to the dividing plane of P (i.e. parallel to the plane of FIGS. 4A, 4B) each pair of the referred-to component rays will traverse this wedge at points of equal thickness. Consequently, wedge W in such orientation does not affect the fringes of interference. It does, however, serve as a window protecting the prism $P_R$ from the accumulation of dust. The function of wedge W for purposes of calibration will be discussed as the description proceeds.

Optical Adjustments

The prism $P_1$ is centered over the aperture in plate 50 with its end faces parallel to plates 52a and 52b. Using the base surface C of prism $P_1$ as a plane mirror the pinhole aperture corresponding to source $S_1$ is located in the focal plane of lens L by varying the length of collimating tube 32 at a point in this plane where the light will form an image of the aperture upon itself. This places the light beams after division at the referred-to dividing plane of prism $P_1$, normal to the prism base surface $C_1$ and, consequently, parallel to each other.

For calibration, a gage block G the end faces of which are parallel to each other, is placed on the center of perforated plate 53 with its lower surface parallel to the top surface of plate 53. When the surface of the block is adjusted parallel to the base $C_1$ of prism $P_1$ by means of the described adjusting screw arrangement, the light from source $S_1$ will be reflected normally from the top surface of the gage block and observed at the objective $S_1'$ as interference fringes.

The parts of the light beams that are not intercepted by the gage block and its support plate 53 traverse the optical wedge W and enter the right angle prism $P_R$ located at the base of the instrument. After two internal reflections in prism $P_R$ the light returns along a path that is symmetrical to its incident path with respect to the 90° edge of $P_R$. The 90° edge of $P_R$ is made normal to the dividing plane of double-image prism $P_1$ by means of the adjusting screw 61. This light forms the background fringes used in the test but no interference will be manifested until the edge of prism $P_R$ is nearly normal to the dividing plane in prism $P_1$. When it is not normal the two images of this edge formed by the two component light beams intersect in the extension of the beam dividing plane. The prism $P_R$ is then rotated until the two images coincide—perfection being attained when the background fringes have maximum contrast.

The above-mentioned contrast in the background fringes is not affected by adjusting screw 61 since it has no vertical rotational effect on the prism. Its effect is to change the width of the background fringes only. When the background fringes are made infinitely broad the collimated beam of light returns toward prism $P_1$ parallel to the incident beam—all rays having suffered a horizontal shift in reflecting prism $P_R$ as illustrated in FIG. 4C.

The referred-to holes in the gage block support plate 53 are so spaced that when plate 53 is rotated to one of the four positions for which the rectangular sides of the gage block under test are either parallel or perpendicular to the dividing plane in prism $P_1$, all light that goes through plate 53 returns again through it. That is, the apertures in plate 53 are symmetrical both with respect to the dividing plane of prism $P_1$ and the 90° edge of prism $P_R$.

Parts of the beam (rays 3, 3', 4, 4' in FIG. 4E) will pass downward to $P_R$, shift horizontally in $P_R$, and pass upward through other apertures in plate 53 to $P_1$. Other parts of the beam (rays 2 and 2' in FIG. 4E) will pass downward, shift horizontally in $P_R$, pass upward through plate 53 to the lower surface of the gage block, return through 53 to $P_R$ and again upward through 53 to $P_1$. If the two end faces, $G_1$ and $G_2$, are parallel, the light will be incident on $G_1$ and $G_2$ at equal angles. When $G_1$ is adjusted normal to the light, $G_2$ will also be normal to it.

It will be apparent that three sets of fringe patterns are involved in the instrument. (1) The fringes formed by light reflected from the top face $G_1$ of the gage block G, (2) those formed by light reflected from prism $P_R$ but not incident on the gage block and (3) the set of fringes formed by light that is reflected from prism $P_R$ to the lower surface of gage block G and back through $P_R$. The direction of the first mentioned set determines the angle between the top surface of gage block G and the incident wave front; the width of the second mentioned set determines the direction between the incident and reflected beams to and from $P_R$; and the orientation of the third set determines the angle between the lower surface of G and the beam after reflection from $P_R$.

The set of fringes $F_1$ (FIG. 4H) is adjusted (by means of adjusting screw 57) normal to the dividing plane of prism $P_1$ for which condition the top of gage block G is normal to the incident light. The background fringes $F_2$ (FIG. 4H) are made infinitely broad, for which condition the light beams returning from $P_R$ are parallel to the incident beam. Now, if fringes $F_3$ are parallel to those of $F_1$, the two surfaces of G are parallel. If the surfaces are not parallel the fringes in $F_3$ will not be parallel to those in $F_1$ and the angle between them is a measure of the angle between the two end surfaces of the gage block.

The optics of the embodiment of FIGS. 4A and 4B is illustrated in FIGS. 4C–4G. The indicated rays 1 and 2 in FIG. 4C do not lie the geometric center. Their positions relative to the geometric center are indicated in FIG. 4G which is a vertical view of FIG. 4D. The two surfaces $G_1$ and $G_2$ of the gage block G under test appear as images G and G' in FIG. 4G. $G_2'$ in FIG. 4C is an image of gageblock surface $G_2$ as seen by light reflected from the right angle prism $P_R$.

The plane optical wedge W and its image W' are shown between test gage block G and its image G'. FIGS. 4D, 4E, and 4F are sections through 4C taken along the section lines indicated in FIG. 4C. The gage block is not located in the center as in the case of the modification of FIG. 3.

The two previously described component rays of light 1 and 1' are caused to reflect normally from test gage surface $G_1$ by adjusting the position of gage G with a leveling screw as was described in connection with FIG. 3. The component rays return into double-image prism $P_1$ where they recombine to produce a pattern of interference fringes $F_1$ as shown in FIG. 4H. The two component rays 2 and 2' are transmitted through the optical wedge W, suffer two internal reflections in reflecting prism $P_R$ and, if $P_R$ is properly adjusted, return parallel to their directions of incidence through wedge W to gage surface $G_2$.

The wedge W is adjusted initially by rotation so that its thickness is constant at all points in either of the planes represented by section lines E, D, and F in FIG. 4C. When in this neutral position, wedge W does not affect the interference fringe pattern because of compensation in each pair of component beams that pass through it.

In order to measure the angle between gage surfaces $G_1$ and $G_2$ the deviation of the light by $P_R$ toward or from the dividing plane of prism $P_1$ must either be reduced to zero or eliminated by measuring the observed angle for two orientations of gage G that are 180° apart. The difference between these two observed angles is twice the angle to be measured.

The light that is not intercepted by gage block G forms the set of background fringe patterns shown in FIG. 4H. Such pattern is of uniform tint and fills the background about and between the two images of the gage block as shown in FIG. 4H. FIG. 4H shows the observed conditions when the ends of the gage block are parallel and nonparallel respectively. A typical pair of component rays 3 and 3' travel downward in FIG. 4E and upward in FIG. 4F. If the right angle edge of $P_R$ is normal to the dividing plane of prism $P_1$ the pair of rays 3 and 3' in 4E can be made to return in planes that are parallel to the dividing plane, by rotating $P_R$ about an axis parallel to the plane of the figures and normal to the incident light. This condition is attained when the background fringes are infinitely broad.

The direction of the background fringes when not infinitely broad remain parallel to the dividing plane because, for each pair of component rays, such as 3 and 3', there is a corresponding pair, 4 and 4' that travels identical paths but in opposite directions. The optical path differences are, therefore, equal to each other and also equal to that for any other pair of component rays in the planes of FIGS. 4E and 4F. The order of interference along the dividing plane corresponds to the optical path difference introduced into the double image prism by the built-in wedges at the point where the right angle edge of $P_R$ intersects the dividing plane prism of $P_1$.

When the background fringes are infinitely broad (uniform tint in white light or uniform density in monochromatic light) the pair of component rays 1—1' are in the same planes as the pair 2—2' shown below G in FIGS. 4C and 4F. In gage surfaces $G_1$ and $G_2$ are parallel, the fringe patterns $F_1$ and $F_2$ (FIG. 4H) formed by them will be parallel. If gage surfaces $G_1$ and $G_2$ form a wedge, with a component in the plane of 4D that differs from zero, the fringe patterns $F_1$ and $F_3$ will not be parallel. The angle between these fringes is a measure of the wedge component between gage surfaces $G_1$ and $G_2$ in the plane of FIG. 4F.

In general, due to the inherent error of judging when the background fringes are infinitely broad and to imperfections in the optical elements, a more precise evaluation of the wedge between $G_1$ and $G_2$ can be obtained by measuring the wedge for two positions that differ by 180°. If the background fringes are unaltered the instrumental errors will be equal for the two positions and the value of the wedge unchanged except in sign. Consequently, the algebraic difference yields twice the value of the wedge.

There are three methods by which the obliquity between gage surfaces $G_1$ and $G_2$ can be evaluated. The first method is to rotate prism $P_R$ by means of its supporting plate 64 (FIG. 4A) until the order of interference at points C and E (FIG. 5A) are equal; then rotate the gage block until the order at points A and B are equal;

and finally, observe the difference in order of interference at points F and H. FIGS. 5A–5C are diagrammatic illustrations showing the relationship among the fringe patterns involved.

In accordance with the second method, after performing the above operations, instead of reading the order difference between F and H, this order difference is reduced to zero by rotating wedge W (FIG. 4A) and the resultant change on a scale 63 (FIG. 1A) attached to W is read. This scale 63 may be calibrated with monochromatic light and the units may be radians, degrees or the corresponding variation in height of the block. A third method is to leave the wedge in its neutral position, adjust G so that the orders of interference of A and B are equal and change the order at H to equal that at F by rotating $P_R$ about an axis normal to the incident light and parallel to the plane of FIG. 4A. The order of interference between two points such as C and D (FIG. 5A) after rotating $P_R$ will be equal to one-half of that between F and H before this rotation was performed. By choosing a point, such as E in FIG. 5A, such that distance CE equals K times CD the order difference between C and E will be K times that between C and D, thus increasing the sensitivity of the observations.

When using this method for testing gages that are almost parallel the angle between $G_1$ and $G_2$ will be small and the background fringes will be too broad for reading fractions of fringes. To eliminate this difficulty an optical wedge illustrated in FIG. 5B is constructed and from it two sections $W_2$ and $W_2'$ are cut and placed on prism $P_R$. The wedges $W_2$ and $W_2'$ are equal but when placed in the position shown the effect is to narrow the background fringes seen through them. The results are illustrated in FIG. 5C. The difference in thickness of $W_2$ and $W_2'$ at a selected reference point E (FIG. 5C) is determined by the choice of the corresponding position on the wedge from which they were cut. This difference in thickness is chosen so as to cause the zero order of interference to pass through the chosen point when the background fringes about $W_2$—$W_2'$ are infinitely broad.

If the angles of wedges $W_2$ and $W_2'$ are properly chosen the width of the fringes seen through them will be most favorable for measuring the fractional parts of fringes. Also, the position of the zero order fringe, relative to point E, may be calibrated to read directly the angle between the ends of the gage blocks.

The recommended procedure for measuring a block is: (1) Adjust the two sets of fringes seen on the ends of the block so that they are perpendicular to the dividing plane, as in FIG. 4H, (2) note the position of the zero order fringe (or absolute order at E, FIG. 5A), (3) rotate the block 180° about a vertical axis through its center, (4) readjust the fringes to restore the condition of (1) above, (5) again note the position of the zero order fringe (or absolute order at E), (6) the difference in the two observed orders at E, or positions of the zero order fringe, multiplied by the constant K, described above, is a measure of the angle between the ends of the block.

It will be apparent that the embodiments shown are only exemplary and that various modifications can be made in construction and arrangement within the scope of invention as defined in the appended claims.

What is claimed is:

1. An interferometer for testing the degree of parallelism between opposite surfaces of a gage block or the like comprising: a first and second double-image prism each having an internal semitransparent light beam dividing plane perpendicular to the base face of the prism, means mounting said double-image prisms so that the beam-dividing planes in the prisms are coplanar and the base faces of the prisms are opposite and parallel with respect to each other, means for directing a beam of light normal to a first face of each of said prisms whereby said incident light beam is divided into component light-ray pairs by said beam-dividing plane in each of said prisms respectively, means for mounting a gage block between said prism base faces with the opposite gage block surfaces to be tested parallel with each of said respective prism base faces, optical objective means mounted normally to a second face of each of said double-image prisms respectively whereby incident and reflected component light-ray pairs from the light beam directed to one of said prisms produces fringe patterns on the objective means associated with the other of said prisms and adjustable means for varying the position between the gage blocks under test and said prisms for correspondingly varying the angular relation between said fringe patterns, a base frame, each of said double-image prisms and associated light beam directing means and objective means comprising a unitary optical assembly, and means adjustably mounting each of said optical assemblies on opposite ends of said base frame for independent movement relative to said base frame.

2. An interferometer for testing the degree of parallelism between opposite surfaces of a gage block or the like comprising: a first and second double-image prism each having an internal semitransparent light beam dividing plane perpendicular to the base face of the prism, each of said double-image prisms comprising a double-section Kosters prism in which the prism sections are rotated relative to each other about an axis normal to the dividing plane in each prism, means mounting said double-image prisms so that the beam-dividing planes in the prisms are coplanar and the base faces of the prisms are opposite and parallel with respect to each other, means for directing a beam of light normal to a first face of each of said prisms whereby said incident light beam is divided into component light-ray pairs by said beam-dividing plane in each of said prisms respectively, means for mounting a gage block between said prism base faces with the opposite gage block surfaces to be tested parallel with each of said respective prism base faces, optical objective means mounted normally to a second face of each of said double-image prisms respectively whereby incident and reflected component light-ray pair from the light beam directed to one of said prisms produces fringe patterns on the objective means associated with the other of said prisms and adjustable means for varying the position between the gage blocks under test and said prisms for correspondingly varying the angular relation between said fringe patterns.

References Cited in the file of this patent

FOREIGN PATENTS

| | | |
|---|---|---|
| 465,365 | Germany | Sept. 15, 1928 |
| 595,211 | Germany | Apr. 12, 1934 |
| 555,672 | Great Britain | Sept. 2, 1943 |